Figures 1, 2, 3:
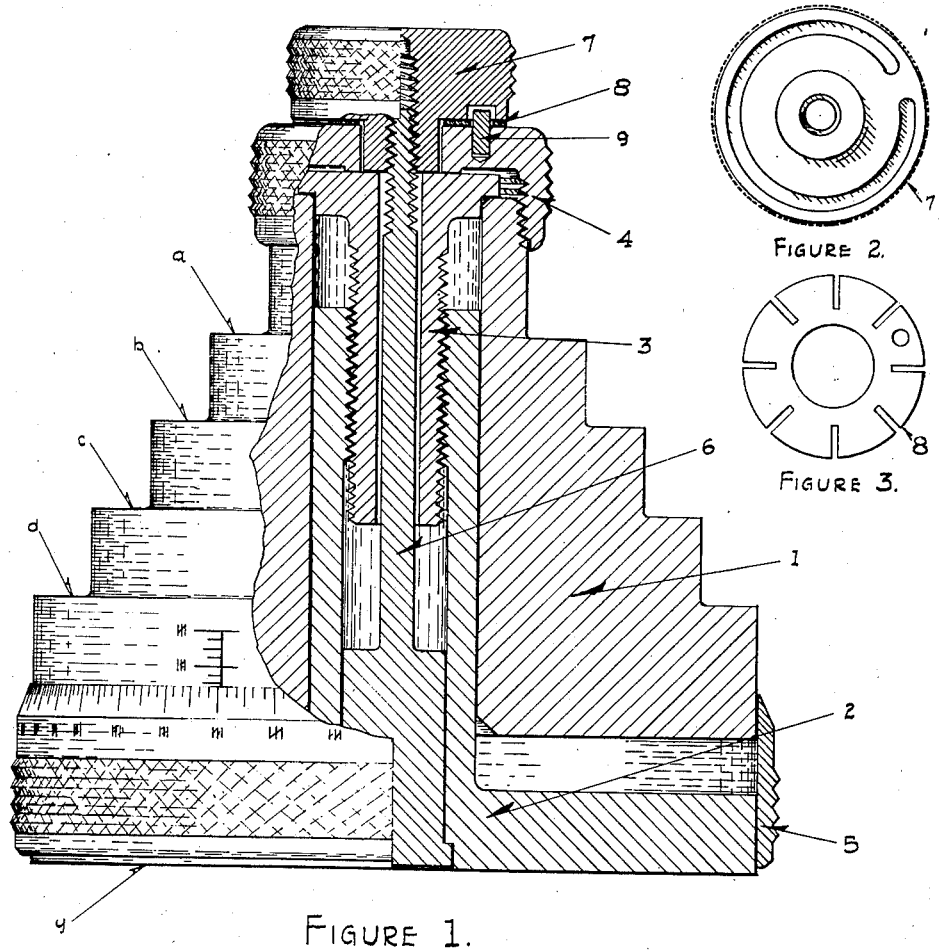

April 4, 1944.  J. R. FREDERICK  2,345,591

MICROMETER MASTER GAUGE

Filed Jan. 27, 1941

WITNESSES:

INVENTOR:
Jean R. Frederick

Patented Apr. 4, 1944

2,345,591

UNITED STATES PATENT OFFICE 2,345,591

MICROMETER MASTER GAUGE

Jean R. Frederick, Emporium, Pa.

Application January 27, 1941, Serial No. 376,227

6 Claims. (Cl. 33—164)

This instrument is offered as an original and improved method of establishing the distances between parallel gauging surfaces with precise definition. It is designed to be of use as a precision measuring instrument in the manufacture and inspection of machines, tools and industrial products. It may be used alone or in conjunction with standard fixed-size blocks as a master for setting indicators, comparators, machine stops or as a height gauge.

The device is illustrated in the drawing in which Figure 1 is an elevation of the complete assembly with sections cut away to a plane passing through the axis of the instrument to show the internal details. Figure 2 is a plan view of the lock nut, observed from the side adjacent to the compression spring washer, to show the stop arrangement. Figure 3 is a plan view of the compression spring washer.

The different parts are designated by numerals, the small letters designate the gauging surfaces of the base and the steps of the cone.

A stepped cone 1, so named because the several steps or gauging surfaces d, c, b, etc., being concentric annular sections of parallel planes, are of smaller diameter as their respective distances from the base is larger, describing in general the frustrum of a cone, is cored by an accurately finished cylindrical hole. The axis of the cylindrical hole is perpendicular to the parallel gauging surfaces; this axis is the common axis of all the parts, except 9: all radial dimensions refer to this axis and all the plane surfaces, except those of the slots in the compression spring washer, are perpendicular to it; all motions of the parts are spirally around and along this axis.

The stepped cone 1, is supported by an integral base and column 2, the base being in the form of a disc with the cylindrical column issuing perpendicularly from its center. The cylindrical column is of such a diameter that will neatly fit the cylindrical hole of the stepped cone 1, allowing the cone to turn around or move along it. The plane surface of the base opposite the column is the basic gauging surface $y$, and is accurately finished perpendicular to the column and hence, in all positions of its limit of motion, parallel to the gauging surfaces a, b, c, etc.

A lead screw 3, threaded to fit a threaded section of a hole through the axis of the column 2, is held integral with the stepped cone 1, by a cap nut 4, which is internally threaded to engage threads on the smaller diameter of the cone, clamping the head of the lead screw against the end of the cone.

This arrangement relates the positions of the cone along the axis (and the positions of the gauging surfaces a, b, c, etc., with reference to the base plane $y$), in a direct, linear mathematical ratio to the circular positions of the cone with reference to the base. For the purpose of determining these circular positions a collar 5, graduated circularly on the edge adjacent to the cone, is fastened integrally to the diameter of the base, extending over the larger diameter of the cone. A reference line, or system of reference lines, is, or are, placed parallel to the axis on the larger diameter of the cone, as reference to the circular graduations of the collar; a system, or systems of reference lines are placed in conjunction therewith to determine the approximate linear positions of the cone 1, on the base and column 2.

The head of a locking screw 6, is fastened integrally with the base and column 2, into the unthreaded section of the hole through the axis of the column, with the threaded shank of the screw extending through a clearance hole through the axis of the lead screw 3, and into the threads of the lock nut 7, which has a round boss extending through a clearance hole in the compression spring washer 8, and through a guiding hole in the cap nut 4, of a length that will reach, and tighten against, the lead screw. The pitch and direction of the locking screw is the same as the pitch and direction of the lead screw, so that if the cone 1, and the lock nut 7, are turned together the distance between them will remain the same. When, however, the lock nut is turned independently of the cone, in a manner that will cause it to approach the lead screw, compressing the compression spring washer, the device will become locked in a fixed position. The reverse action will release the device for a change of setting.

The compression spring washer 8, placed between the lock nut 7, and the cap nut 4, serves the purposes of keeping the lost motion of the lead screw always in one direction and of keeping the position of the lock nut 7, approximately fixed with respect to the cap nut 4, being compressible approaching flatness in the locking position.

A pin 9, fastened into the cap nut 4, and extending through a hole in the compression spring washer 8, into an incompletely annular groove in the lock nut 7, limiting the rotary motion of the lock nut to prevent its inadvertent removal.

Having established, and knowing the distances between the basic gauging surface and the gauging surfaces of the several steps of the cone, $y$ to $a$, $y$ to $b$, $y$ to $c$, etc., at any given setting, and knowing the ratio of longitudinal movement to rotary movement as determined by the lead screw 3, the distances between $a$ and $y$, $b$ and $y$, $c$ and $y$, etc., may be precisely changed to any desired distance within the scope of the instrument by rotating the cone 1, around the base and column 2, the requisite amount, using the graduations of the collar 5, to measure the rotary movement. The several steps of the cone, $a$, $b$, $c$, etc., being so arranged as to increase the scope of the instrument several times the working length of the lead screw, the probability of error is thereby reduced.

Adjustment of the reference line, or lines, on the cone 1, to any desired graduation on the collar 5, without altering the gauging distances, may be accomplished by loosening the cap nut 4, and turning the cone to that position without turning the lead screw 3.

The lock nut 7, cap nut 4, and collar 5, may be knurled or grooved for convenience in handling.

I am aware that, prior to my invention, measuring instruments have been made that combine the use of a lead screw with graduated indexing attachments. I therefore do not claim such a combination broadly; but

I claim:

1. In combination in an instrument for measuring distance, a stepped cone provided with a plurality of parallel gauging surfaces, a base member having a central column extending through a central opening in said cone, a lead screw engaging said column and cone and arranged to translate rotary motion of said cone into axial motion thereof and a graduated indexing collar around said base and the lower portion of said cone to determine the value of axial movement in terms of rotary movement.

2. In combination in an instrument for measuring distance, a stepped cone provided with a plurality of parallel concentric gauging surfaces, a disc-like base member having a central column rising through a central opening in said cone, a lead screw engaging said column and the top of said cone and a graduated indexing device engaging said base and cone.

3. A measuring instrument comprising a vertical axial column, a disc-like base member for such column and a stepped cone provided with a plurality of annular concentric gauging surfaces decreasing in diameter from bottom to top, said stepped cone being mounted on such column and being capable of both vertical and rotatory movement with relation thereto.

4. A measuring instrument as set forth in claim 3 in which an annular collar is disposed around said base member and the lower portion of said cone and in which said collar and said lower cone portion are provided with cooperating measuring indicia.

5. A measuring instrument comprising a vertical axial column, a disc-like base member for such column, a stepped cone provided with a plurality of horizontal annular gauging surfaces decreasing in diameter from bottom to top, said stepped cone being mounted on such column and being capable of both vertical and rotatory movement with relation thereto and a lead screw engaging the column and the top of the cone, the construction and arrangement being such that vertical movement of said cone is effected by and in known relationship to rotary cone movements.

6. A measuring instrument comprising a disc-like base member, having a lower surface which constitutes a basic gauging surface, an integral hollow column perpendicular to and rising from the base member and the upper portion of the bore of which is interiorly threaded, a stepped cone having a central opening for the reception of said column and configured to provide a plurality of parallel concentric gauging surfaces decreasing in diameter from bottom to top, the upper portion of the cone being exteriorly threaded, a hollow lead screw provided with a head seated on the upper edge of said cone and an exteriorly threaded shank extending down into the bore of said hollow column and in threaded engagement with the threaded upper portion of such bore, a centerless cap nut seated on the head of the lead screw and having a depending annular flange which is interiorly threaded and in threaded engagement with the exteriorly threaded upper portion of said cone, a decentered pin mounted in and projecting upwardly beyond said cap nut, a centerless spring washer on said cap nut having a hole through which said pin extends, a locking screw provided with a head which is anchored in the base member and with a cylindrical shank extending upwardly through said hollow lead screw and beyond said cap nut and spring washer and the upper portion of which shank is exteriorly threaded and a lock nut having a head resting on said spring washer and a hollow shank extending downwardly through said spring washer and through said cap nut and having a threaded axial bore in threaded engagement with the upper threaded portion of said locking screw, the said lock nut head being grooved out on its underside for the reception of said pin and the groove being of such annular extent as to provide for a maximum relative movement somewhat less than 360°.

JEAN R. FREDERICK.